Jan. 16, 1951 A. T. BRUNNER 2,537,963
STANCHION
Filed May 19, 1947
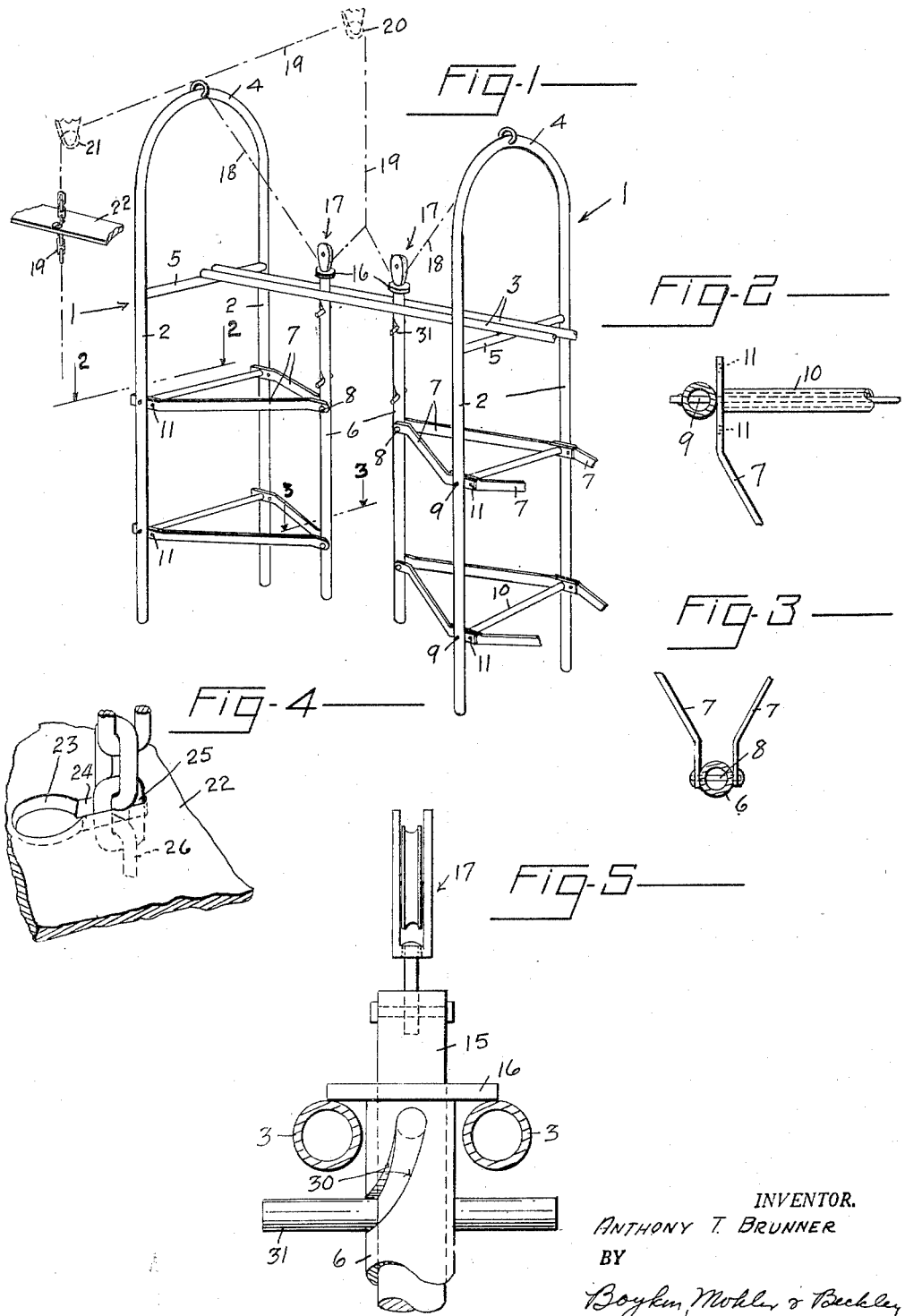
INVENTOR.
ANTHONY T. BRUNNER
BY
Boykin, Mohler & Beckley
ATTORNEYS

UNITED STATES PATENT OFFICE 2,537,963

STANCHION

Anthony T. Brunner, Half Moon Bay, Calif.

Application May 19, 1947, Serial No. 748,941

7 Claims. (Cl. 119—147)

This invention relates to cattle stanchions of the type disclosed in the United States Letters Patent No. 2,068,888 issued January 26, 1937, to Clarence O. Patten.

This type of cattle stanchion is known as a "walk-thru" stanchion and is used principally in the dairy industry. The stanchions are usually in a row, separated by stall frames that support them.

The stanchions close at opposite sides of the necks of the cows preventing withdrawal of the cows' heads during the milking operation. After milking is completed, each stanchion is opened by an operator that is adjacent the rear end of the cow and the cow goes straight ahead through the stanchion and out of the barn or milking shed and another enters the milking station from the rear. This straight ahead exit prevents animals from falling, crowding and jostling in aisles, and walking through gutters.

The advantages of the "walk-thru" type stanchion shown in the above designated Letters Patent are plain, but in many instances the animals have found it possible to lean against the stanchion posts and to raise them sufficiently to either free themselves or to change their positions to an undesirable degree. Also where the stanchions have been used to hold animals during branding, breeding, artificial insemination, and head operations, the animals' activities have resulted in prematurely opening the stanchions.

One of the main objects of this invention is the provision of simple reliable means in stanchions of the above type for quickly locking the stanchions in closed position and for quickly unlocking them.

Another object of the invention is the provision of means actuated by the normal operation of swinging the stanchion posts of a stanchion apart for unlocking the stanchion to release the animal, and which stanchion automatically locks when moved into animal holding position against the efforts of the animal to release the same.

An additional object of the invention is the provision of a "walk-thru" type stanchion that is adapted for use in holding animals during milking, branding, breeding, artificial insemination and during head operations, and which stanchion is provided with means for automatically locking the same closed upon movement of the stanchion posts to holding position and which means is adapted to be actuated by an operator actuating the stanchion opening means for moving the stanchion posts apart to release the animal.

By the present invention, the stanchion posts may be lifted and moved apart in substantially the same manner as shown in the above patent, but the posts are automatically locked against the efforts of the animal to lift them when in their lowermost position.

Other objects and advantages will appear in the description and in the drawings.

In the drawings,

Fig. 1 is a perspective view of the end stanchion of a row and part of the adjacent stanchion.

Fig. 2 is an enlarged fragmentary sectional view taken along line 2—2 of Fig. 1.

Fig. 3 is an enlarged fragmentary sectional view taken along line 3—3 of Fig. 1.

Fig. 4 is an enlarged fragmentary view partly in section, of the hoisting-chain lock and catch.

Fig. 5 is an enlarged fragmentary view showing the upper end of one of the stanchion posts and the locking member.

In detail, each stanchion herein illustrated comprises a stall frame in the form of a pair of inverted U-shaped frame members 1 the legs 2 of which are relatively long and are secured at their lower ends to the floor in any suitable manner. These frame members 1 are in spaced opposed relation with the legs of the respective members in parallel planes and said members are held at their upper ends in said spaced relationship by a pair of parallel, spaced, horizontally extending frame elements 3 that extend longitudinally of a row of said frame members below the arches 4 that connect the upper ends of the legs of each of said frame members. Horizontal cross pieces 5 extend between the legs 2 of each of said frame members adjacent but spaced below each of the arches 4, and the frame elements 3 extend over said cross pieces 5 and are rigidly clamped or welded thereto. The elements 3 are at a level above the animals adapted to be held by the stanchions so the said animals may pass therebelow.

Between adjacent pairs of frame members 1 are parallel vertically extending stanchion posts 6. These posts are connected with the legs 4 of the frame members 1 by links 7. There are preferably two pairs of links 7 for each of the posts thus insuring parallel relationship between the posts during their swinging movement toward and away from each other.

The links 7 of each pair are pivoted at one of their ends to a post 6 by horizontal pivot 8. The links of each pair then extend divergently from post 6 to the legs 2 of the frame member adjacent thereto where they are pivoted to said frame member by pivot means 9 which may comprise a rod extending between and through the legs 2. This rod also functions as the pivot for one of the ends of the pairs of links that extend into the adjacent stall for pivotally supporting one of the stanchion posts in such adjacent stall as indicated in Fig. 1. Spacer frame tubes 10 may extend between legs 2 of each of the frame members and through which tubes the rods 9 extend.

The ends of the links 7 through which rods 9 extend may have several openings 11 thus making the stanchions adjustable to different breeds of animal or cattle. For example, one breed of cows may be smaller than another, necessitating, or making desirable, a different spacing between stanchion posts than where the stanchions are employed for a larger breed.

The upper ends of the posts 6 extend between the horizontal frame elements 3 and move upwardly and downwardly between said elements as well as moving oppositely outwardly. Normally, when the links 7 are substantially horizontal, the posts of each stanchion are in animal holding position, being at their closest distance from each other. If the neck of the animal is between the posts, then the animal cannot withdraw its head, nor can it pass through the stanchion.

Posts 6 are preferably made of pipe or tubular stock, and within the upper end of each post is a cylindrical bar 15 (Fig. 5) which bar is rotatable and reciprocable in said upper end. Bar 15 may be a section of a pipe or it may be solid, and the same projects upwardly from the upper end of the post 6.

A radially outwardly projecting flange 16 is secured to the upper end of each post. This flange extends over the elements 3 and functions to support the posts 6 when the latter are in their lowermost animal holding position. Thus flange 16 limits the downward movement of each post.

The projecting end of each bar 15 carries a pulley 17 and a flexible line 18, such as a chain, cable or rope, extends between the arches 2 of each pair of stall frame members and below the wheels of the pulleys on the bars 15 of the posts of each structure, as best seen in Fig. 1. A chain 19 connects with the line 18 at a point between the pulleys 17 of each stanchion, which chain extends upwardly and over a pulley 20 that may be secured to any suitable overhead portion of the barn or shed and then said chain extends horizontally to a point over the spot where an operator positioned adjacent the rear end of an animal that is held by the stanchion would be standing. At this point chain 19 extends over another pulley 21 that may also be suitably secured to any suitable overhead portion of the barn or shed and from this pulley 21 the chain extends downwardly to where the operator may grasp the lower end thereof.

Between the lower end of chain 19 and pulley 21 the chain extends through a keyhole shaped opening in a horizontal plate 22 that may be secured to an overhead beam in the barn. The chain will run freely through the enlarged portion 23 (Fig. 4) of said opening, but when the downwardly extending length of the chain is moved toward the restricted slot 24 that opens into the portion 23, one of the chain links 25 will slide into the slot at any point along said length of chain, but the link 26 below link 25 will prevent the chain from sliding upwardly through the slot.

The upper tubular end of each post 6 is formed with a pair of opposed spirally or angularly extending slots 30, and a pin 31 extends through each bar 15 and into said slots 30 at its opposite ends. Each pin 31 also projects a sufficient distance outwardly of slots 30 to prevent upward movement of the post 6 past elements 3 due to their engagement with said elements when said pins extend at right angles to the elements 3.

The pins 31 extend at right angles to elements 3 and below the latter when the stanchion posts are at their lowermost animal holding positions and when the weight of the posts and bars 15 are fully supported on the elements 3. Flanges 16 so hold the posts and bars. In this position, the pins 31 are at the lowermost ends of slots 30.

As soon as the operator pulls on the chain 19 the bars 15 of the stanchion will be elevated and they will be automatically rotated to move pins 31 until the latter are parallel with elements 3 and will pass between the latter. Then a continued pull on chain 19 will cause the stanchion posts to be elevated since the pins 31 will then be at the top of slots 30 and they will carry the weight of posts 6.

When the stanchions have been raised to the desired height the operator merely swings the chain 19 so that a link 25 will enter the slot 24 and the stanchion will be held open until the cow walks on through the same.

As soon as the stall is cleared, the operator releases chain 19 and drops the stanchion posts about half way down. This permits the next cow to move its head between the stanchion posts, but its shoulders will engage the posts.

The posts are then dropped, thus closing the stanchion and as soon as the weight of the posts is off the bars 15 the latter will rotate to bring pins 31 crosswise of the elements 3, and below the latter. The stanchion will then be positively locked until the operator pulls chain 19 to lift the posts.

As seen in the drawings, there are two sets of identical slots 30 and pins 31 on each stanchion post. The upper slots and pins have been described.

When the stanchion posts are lowered to permit the head of the cow to pass between them, but not the body, the elements 3 are between the two sets of slots on the respective posts and the pins 31 are parallel with said elements. If, however, the cow should try to "shoulder" the posts apart, the bars 15 will be rotated relative to the posts and the lower sets of pins 31 will move to lock the posts against sufficient upward movement to allow the cow or animal to pass between the posts.

It is to be understood that the detailed description and drawings are not to be considered restrictive of the invention, but are merely illustrative of a preferred form thereof.

I claim:

1. In a stanchion having a pair of spaced upright stanchion posts and a stall frame, means supporting said posts on said frame for swinging of said posts upwardly and oppositely outwardly, locking elements on said posts carried thereby for movement therewith, and means on said frame engageable by said elements for locking said posts against said swinging, post elevating means connected with said elements for moving said elements to positions releasing the same from engagement with the said means on said frame and for swinging said posts upwardly and outwardly when said locking elements are so released.

2. In a stanchion having a pair of spaced upright stanchion posts and a stall frame, means supporting said posts on said frame for swinging of said posts upwardly and oppositely outwardly, locking elements on said posts carried thereby for movement therewith, and means on said frame engageable by said elements for locking said posts against said swinging, post elevating means connected with said elements for moving said elements to positions releasing the same from engagement with the said means on said frame and for swinging said posts upwardly and outwardly when said locking elements are so released, said post elevating means comprising a flexible line extending upwardly from said posts and then laterally to a point remote therefrom for pulling by an operator at said remote point.

3. In a stanchion having a pair of spaced upright stanchion posts and a stall frame, means supporting said posts on said frame for swinging of said posts upwardly and oppositely outwardly, locking elements on said posts carried thereby for movement therewith, and means on said frame engageable by said elements for locking said posts against said swinging, post elevating means connected with said elements for moving said elements to positions releasing the same from engagement with the said means on said frame and for swinging said posts upwardly and outwardly when said locking elements are so released, said post elevating means comprising a flexible line extending upwardly from said posts and then laterally to a point remote therefrom for pulling by an operator at said remote point, and said locking elements being movable longitudinally of said posts for a predetermined distance upon the operator pulling said line.

4. In a stanchion having a pair of spaced upright stanchion posts and a stall frame, means supporting said posts on said frame for swinging of said posts upwardly and oppositely outwardly, locking means respectively on said frame and on said posts movable relatively from a locked position locking said posts against said swinging to an unlocked position releasing said posts for permitting said swinging, manually actuatable post elevating means connected with said locking means and means for successively moving said locking means to said unlocked position and for then swinging said posts upwardly and outwardly, said locking means including elements projecting laterally from one of said posts and toward a shoulder of an animal positioned with its neck between said posts when said locking means is in said locked position, said elements being movable to positions extending toward each other and toward said neck when said locking means is in said unlocked position.

5. In a stanchion having a pair of spaced upright stanchion posts of tubular form at their upper ends, a stall frame, links pivotally connected with said posts and with said stall frame supporting said posts for upward and oppositely outward swinging movement, a bar extending into the upper end of each post and projecting upwardly therefrom, said bars being rotatable and reciprocable in said posts, angularly upwardly extending guide means on each post and a guide element on each bar in engagement therewith for causing rotation of each bar upon upward movement of the latter relative to the post carrying the same, means for limiting the upward movement of each of said bars relative to said posts, means connected with each bar for lifting the same and for lifting said posts upon said bars reaching the upper limits of their movement relative to said posts, a rigid member on said stall frame adapted to engage said guide elements for preventing upward swinging of said posts until said bars are so rotated by lifting the latter whereby lifting of said posts independent of rotation and elevation of said bars relative to said posts is precluded.

6. In a stanchion having a pair of spaced, upright stanchion posts of tubular form at their upper ends, a stall frame, links pivotally connected with said posts and with said stall frame supporting said posts for upward and oppositely outward swinging movement, a bar extending into the upper end of each post and projecting upwardly therefrom, said bars being rotatable and reciprocable in said posts, angularly upwardly extending guide means on each post and a guide element on each bar in engagement therewith for causing rotation of each bar upon upward movement of the latter relative to the post carrying the same, means for limiting the upward movement of each of said bars relative to said posts, means connected with each bar for lifting the same and for lifting said posts upon said bars reaching the upper limits of their movement relative to said posts, a rigid member on said stall frame adapted to engage said guide elements for preventing upward swinging of said posts until said bars are so rotated by lifting the latter whereby lifting of said posts independent of rotation and elevation of said bars relative to said posts is precluded, said means for lifting said bars comprising pulleys on the projecting ends of said bars and flexible lines connected with said stall frame at one of their ends and extending below said pulleys to a juncture between the latter and a single flexible line extending from said juncture to the rear end of the stall frame.

7. In a structure having a pair of parallel spaced upright stanchion posts and a stall frame, means suporting said posts on said frame for swinging of said posts in parallel relationship upwardly and oppositely outwardly from animal holding position at opposite sides of the neck of such animal in which neither the head nor the body of such animal can pass between said posts to a released position in which both the head and body can pass, means operatively associated with said frame for supporting said posts parallel in head passing position between said holding and released positions and spaced to permit the head only of said animal to pass but not the body, movable means engageable with said last mentioned means for releasably locking said posts against movement from said head passing position to said released position upon application of upward pressure by said animal against said posts, and post elevating means connected with said movable means for actuating the same and for moving said posts to said released position.

ANTHONY T. BRUNNER.

REFERENCES CITED

The following references are of record in the file of this patent:

UNITED STATES PATENTS

| Number | Name | Date |
| --- | --- | --- |
| 155,908 | Well | Oct. 13, 1874 |
| 646,251 | Young | Mar. 27, 1900 |
| 939,228 | Dobry | Nov. 9, 1909 |
| 2,234,366 | Carter | Mar. 11, 1941 |

FOREIGN PATENTS

| Number | Country | Date |
| --- | --- | --- |
| 16,229 of 1923 | Australia | June 18, 1929 |